United States Patent Office 3,839,434
Patented Oct. 1, 1974

3,839,434
AMIDINE SUBSTITUTED NAPHTHALENE
CARBOXYLIC ACID
Walter Dammert, Frankenthal, Germany, assignor to
Badische Anilin- & Soda-Fabrik Aktiengesellschaft,
Ludwigshafen (Rhine), Germany
No Drawing. Filed Apr. 23, 1971, Ser. No. 137,072
Claims priority, application Germany, Apr. 27, 1970,
P 20 20 477.7; Oct. 24, 1970, P 20 52 253.6
Int. Cl. C07c 101/42
U.S. Cl. 260—519       1 Claim

ABSTRACT OF THE DISCLOSURE

A new compound having the formula:

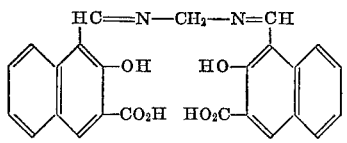

which (1) is a yellow pigment having high brilliance and excellent fastness properties, and
(2) can be converted by hydrolysis into a high yield of 2-hydroxy-3-carboxynaphthaldehyde-(1).

---

It is known that by reaction of phenolic compounds having a free o-position or p-position with hexamethylenetetramine in glacialacetic acid followed by acid hydrolysis of the reaction mixture, the corresponding aromatic o- and p-hydroxyaldehydes can be obtained. (J. C. Duff, J. chem. Soc. (London), 1932, page 1987; 1934, page 1307.)

This method, known as Duff reaction, is often used for the production of various hydroxyaldehydes, preferably in the embodiment in which at a reaction temperature of from 150° to 170° C. glacial acetic acid is relaced by glycerol boric acid or ethoxyethanol boric acid (see "Methoden der organischen Chemie," Houben-Weyl, 1st edition, volume VII/1, page 198, G. Thieme-Verlag, Stuttgart, 1954).

The reaction of phenols and naphthols with hexamethylenetetramine proceeds via intermediates which have been recognized in the case of β-naphthol as azomethine (J. C. Duff, J. chem. Soc. (London), 1934, page 1307) and in other cases as derivatives of dimethanolamine and trimethanolamine (Marotta, Gazz. Chim. Ital. 61, (1931), 977).

Cases are also described in the said literature in which no intermediates or no defined intermediates could be isolated.

Azomethine formed from β-naphthol in the Duff reaction can be split hydrolytically into 2-hydroxynaphthaldehyde-(1) and 1-aminomethyl-2-hydroxynaphthalene so that the theoretical yield of aldehyde is 50%, but the actual yields are considerably less owing to secondary reactions and difficulties in preparation in this and other cases.

2-hydroxy-3-carboxynaphthaldehyde-(1) is an interesting intermediate for the synthesis of azomethine dyes (see for example German Laid-open Specifications 1,569,710 and 1,569,712).

2-hydroxy-3-carboxynaphthaldehyde-(1) is described in German Patent 98,466 as a yellow powder having a melting point of 170° C., whereas in German Patent 952,629 a decomposition point of 280° C. is specified.

The 2-hydroxy-3-carboxynaphthaldehyde-(1) described in German Laid-open Specification 1,569,710, which is prepared according to the general process of Reimer and Tiemann as a contaminated compound, can be purified by means of sodium hydrogen sulfite followed by recrystallization of the aldehydic acid from alcohol. This compound has a melting point of 227° C. and may be characterized by elementary analysis and by the melting points of the phenylhydrazone and anil.

Neither the Duff reaction (which for the theoretical and practical reasons described above as hitherto given only a low yield) nor the Reimer-Tiemann method (which is unsatisfactory also on account of the low yields and the necessary purification operations) is suitable for an industrial process for the production of 2-hydroxy-3-carboxynaphthaldehyde-(1).

German Patent 952,629 discloses a modified Duff method for the production of aromatic hydroxyaldehydes according to which the aldehydes are obtained in a one-stage method by reaction or aromatic hydroxy compounds with hexamethylenetetramine in glacial acetic acid or acetic anhydride in the presence of formaldehyde or paraformaldehyde followed by hydrolysis of the reaction mixture with mineral acid. According to the statements in Example 5, 2-hydroxy-3-carboxynaphthaldehyde-(1) is obtained in a yield of 77% of theory from 2-hydroxynaphthalenecarboxylic acid-(3).

The modification of the Duff method which is expressed in the addition of formaldehyde or paraformaldehyde, and the one-stage method of production are regarded as the reasons for the lack of undesired byproducts and the achievement of yields which are more than the 50% theoretically possible according to the prior methods.

The decomposition point of the 2-hydroxy-3-carboxynaphthaldehyde-(1) prepared according to Example 5 of German Patent 952,629 is however given as 280° C. and in this differs clearly from that of the product prepared according to Reimer-Tiemann (German Patent 98,466, melting point 170° C. and German Laid-open Specification 1,569,710 melting point 227° C.).

Analytical investigation shows that the product prepared according to Example 5 is a mixture of 2-hydroxy-3-carboxynaphthaldehyde-(1) and a substance melting at about 300° C., in which the aldehyde is present in a proportion of about 50° or less.

Therefore the process according to German Patent 952,629 is also unsuitable for industrial operation because of the unsatisfactory yield and the expenditure in the possible isolation of the aldehydic acid from the said mixture of products.

Since in the abovementioned work of Duff it is stated (1934, page 1307) that it is not possible to obtain any definite compound from the reaction of 2-hydroxynaphthalenecarboxylic acid-(3) with hexamethylenetetramine in glacial acetic acid, it is surprising and not to be foreseen that in the reaction of 2-hydroxynaphthalenecarboxylic acid-(3) with hexamethylenetetramine in carboxylic acids of low molecular weight having more than one carbon atom, preferably in acetic acid or propionic acid, at elevated temperature, nevertheless a well defined product is obtained which can be characterized by melting point, infrared spectrum and elementary analysis and which has the structure of a disazomethine having the formula (I):

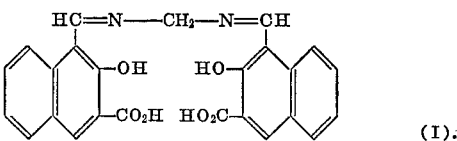
(I).

This compound is obtained in yields of more than 80% of theory by the process according to this invention.

Owing to the extremely low solubility of the compound it may be completely freed from all impurities by washing or by stirring in any of a great variety of solvents at room or elevated temperature. The prouct purified in this way is also suitable as a pigment on account of its excellent tinctorial properties.

The new compound is dissociated by the action of strong acids or caustic alkali solutions into 2-hydroxy-3-carboxynaphthaldehyde-(1), ammonia and formaldehyde.

The aldehydic acid is formed in a yield of about 95% with a purity of more than 99%.

Because of the simplicity of the synthesis and the good yields which can be obtained, the process according to the invention constitutes the first process for the manufacture of 2-hydroxy-3-carboxynaphthaldehyde-(1) suitable for industrial operation.

Production of 2-hydroxy-3-carboxynaphthaldehyde-(1) from 2-hydroxy-3-carboxynaphthaldehyde-(1) from 2-hydroxynaphthalenecarboxylic acid-(3), hexamethylenetetramine and glacial acetic acid followed by hydrolysis of the intermediate may also be carried out in one stage according to the new process, but the aldehyde is then not so pure.

The two-stage procedure with isolation of the intermediate and its hydrolysis to the aldehydic acid is therefore preferred.

An advantageous procedure for the production of the compound having the formula (I) may consist for example in carrying out the reaction of 2-hydroxynaphthalene-carboxylic acid-(3) with hexamethylenetetramine in the presence of acetic acid or propionic acid at temperatures higher than 40° C., preferably at from 60° to 130° C. It has been found that in order to achieve maximum yields in reasonable reaction temperature of from 90° to 115° C. is most favorable.

The mixing ratio of 2-hydroxynaphthalenecarboxylic acid-(3) and hexamethylenetetramine may be varied within wide limits, because the intermediate formed can easily be separated from the reaction mixture due to its low solubility.

It is convenient however to use the said starting materials in a weight ratio of 2-hydroxynaphthalene-carboxylic acid-(3) to hexamethylenetetramine of from 4:1 to 1:2, preferable from 4:3 to 4:5.

The amount of acid is not critical in the reaction of the starting materials in carboxylic acids. It is advantageous to use only such an amount of acid that the mixture remains stirrable at the reaction temperature. Organic solvents may however be added; these as a rule do not cause disturbance and a smaller amount of acid may then be used. Dioxane and toluene are examples of such solvents.

A mixture from which hexamethylenetetramine forms, for example a mixture of formaldehyde and ammonia or ammonium acetate, may be used instead of hexamethylenetetramine.

The intermediate is isolated after the reaction (which requires from about thirty minutes to ten hours according to the reaction conditions chosen) by suction filtration and the filter cake is purified by washing, for example with the acid used and with water or with an organic solvent and/or stirring at ambient or elevated temperature in a great variety of organic solvents.

The new intermediate having the formula (I) is a yellow product which has low solubility in conventional solvents and is therefore suitable as a pigment.

The product which has low solubility in conventional solvents and is therefore suitable as a pigment.

The product thus isolated and purified may be used direct as a pigment. If desired however it may be improved in its pigmentary properties by conventional finishing methods, for example by bringing it into contact with organic solvents at ambient temperature or at elevated temperature. The following solvents are suitable: alcohols such as methanol, ethanol or isobutanol; glycols and glycol ethers such as ethylene glycol or ethylene glycol monomethyl ether; ketones such as acetone or cyclohexanone; acid amides such as dimethylformamide or formamide; carboxylic acids such as acetic acid or propionic acid; hydrocarbons such as toluene, xylene or benzene; and halohydrocarbons such as chlorobenzene. Mixtures of these solvents may also be used.

The pigment is distinguished by high brilliance, great color strength, fluorescence in ultraviolet light and excellent fastness properties. It may be used for all pigment application, for example for coloring printing inks, distempers, binder paints or coating compositions of all types such as nitrocellulose varnish, or for the mass coloration of rubber or plastics, particularly or plasticized polyvinylchloride, polystyrene, polyethylene and polypropylene. It is also very suitable as a dope dye for a great variety of materials such as polyvinyl chloride, polyacrylonitrile, copolymers of acrylonitrile with other vinyl compounds, polyamides, cellulose acetate, secondary cellulose acetate, cellulose triacetate or regenerated cellulose, and also for printing textile material. The pigment may also be formulated.

The intermediate is then hydrolyzed for the production of the aldehyde. Hydrolysis may be carried out in an acid or alkaline medium by a conventional method, for example as described in detail in the literature for dissociating Schiff bases, oximes and hydrazones.

For example the following are suitable: dilute mineral acids, mixtures of alcohol and mineral acid, or dilute caustic alkali solutions. Examples of mineral acids are dilute sulfuric, hydrochlordic or phosphoric acid, sulfuric, phosphoric or hydrochlordic acid diluted with an alcohol, or mixtures of these acids. Examples of caustic alkali solutions are dilute caustic soda solution, caustic potash solution, or mixtures of the two.

In the case of acid hydrolysis, the aldehydric acid formed may be immediately separated by filtration; after washing with water and drying, a very pure compound is obtained which may be directly used for all purposes. When the hydrolysis is carried out in an alkaline medium, for example with caustic soda solution, acidification is then carried out with mineral acid and the precipitated 2-hydroxy-3-carboxynaphthaldehyde-(1) is isolated as described.

The dissociation may be carried out under a protective gas to prevent oxidation of the 2-hydroxy-3-carboxynaphthaldehyde-(1) in the course of the hydrolysis.

The following Examples illustrate the invention. The parts and percentages specified in the Examples are parts by weight and percentages by weight. Parts by volume bear the same relation to parts by weight as the liter to the kilogram.

(A) Production of the intermediate:

EXAMPLE 1

400 parts of hexamethylenetetramine is added over fifteen minutes while stirring to 400 parts of 2-hydroxynaphthalenecarboxylic acid-(3) in 1000 parts by volume of glacial acetic acid, the whole is then kept at 100° C. for another six hours, cooled to about 60° C., suction filtered and the filter cake is washed first with a little glacial acetic acid and then with water and dried. 381 parts of an orange yellow powder is obtained having a melting point of about 250° C.

For purification, the crude product may be stirred at room temperature in five times its amount of dimethylformamide. After suction filtration, washing with water and drying, 356 parts having a melting point of 256° C. is obtained.

EXAMPLE 2

400 parts of hexamethylenetetramine is added over one hour to 400 parts of 2-hydroxynaphthalenecarboxylic acid-(3) in 1200 parts by volume of glacial acetic acid. The whole is then heated for five hours at 115° C., cooled to 60° C. and the precipitated product is suction filtered, washed with glacial acetic acid and then with methanol and dried. 370 parts of an orange yellow compound having a melting point of about 250° C. is obtained.

The crude product may be heated for some hours in ten times its amount of acetone for purification. After suction filtration and drying, 350 parts of the purified product is obtained having a melting point of 257° C.

The intermediate product is obtained in an analytically pure form having a melting point of about 270° C. by treatment of the crude product or the purified substance with a large amount of dimethylformamide at 100° C.

$C_{25}H_{18}N_2O_6$ (442.4)
Calculated: C, 67.87; H, 4.10; N, 6.33; O, 21.70
Found: C, 67.7; H, 4.3; N, 6.4; O, 21.5.

EXAMPLE 3

400 parts of hexamethylenetetramine is added over one hour to 400 parts of 2-hydroxynaphthalene-3-carboxylic acid in 1150 parts of glacial acetic acid while slowly raising the temperature to 80° C. and the mixture is then kept at 115° C. for another six hours. At about 60° C., the product is suction filtered and the filter cake is washed first with a little glacial acetic acid and then with water and dried. 370 parts of an orange yellow pigment powder is obtained. To improve the properties of the pigment, 370 parts of the crude product is stirred in 3700 parts of dimethylformamide for fifty minutes at 100° C., suction filtered at about 40° C. and washed with methanol. 320 parts of a brilliant yellow pigment is obtained having a melting point of about 270° C.

Analysis: $C_{25}H_{18}N_2O_6$ (442.4)
Calculated: C, 67.87%; H, 4.10%; N, 6.33%; O, 21.70%
Found: C, 67.5%; H, 4.3%; N, 6.5%; O, 21.7%.

EXAMPLE 4

100 parts of hexamethylenetetramine is added to 100 parts of 2-hydroxynaphthalene-3-carboxylic acid in 1000 parts of propionic acid and the mixture is kept at 100° C. for seven hours. After cooling to 60° C., the product is suction filtered and the filter cake is washed with methanol and dried. 86 parts of the compound having formula (I) is obtained in the form of a yellow pigment powder.

The properties of this product may be improved for example by heating 50 parts of the crude pigment in 500 parts of methanol for two hours while stirring at the boiling temperature, suction filtration and drying. 47 parts of a yellow pigment powder is obtained having a a melting point of about 270° C.

(B) Hydrolysis of the intermediate:

EXAMPLE 5

20 parts of the intermediate prepared according to Examples 1 to 4 in a mixture of 200 parts by volume of ethyl alcohol, 150 parts by volume of concentrated hydrochloric acid and 50 parts of water are boiled under nitrogen for two hours.

0.1 part of sodium sulfite is then added to the reaction mixture and the whole is cooled to 30° C., the deposited 2-hydroxy-3-carboxynaphthaldehyde-(1) is suction filtered and the filter cake is washed with water.

After drying, 19.2 parts of a yellow product is obtained having a melting point of 192° C. Analytical investigation gives a degree of purity of 96%.

EXAMPLE 6

20 parts of the intermediate prepared according to Examples 1 to 4 in 250 parts by volume of 5% caustic soda solution is boiled under nitrogen for about three hours until the smell of ammonia has disappeared. The whole is cooled, 0.2 part of sodium sulfite is added and the solution is acidified with hydrochloric acid to pH 1 to 2. The mixture is suction filtered to 0° and the filter cake is washed with cold 2N hydrochloric acid and then with water and dried. 19 parts of a yellow powder is obtained which has a melting point of 211° C. Analytical investigation gives a content of 2-hydroxy-3-carboxynaphthaldehyde-(1) of more than 99.3%.

$C_{12}H_8O_4$ (216)
Calculated: C, 66.7; H, 3.7; O, 29.6
Found: C, 66.6; H, 3.8; O, 29.5.

The melting point of the anil of the compound thus prepared is 285° C.

This demonstrates the identity of the 2-hydroxy-3-carboxynaphthaldehyde-(1) prepared according to this process with the highly purified product described in German Laid-open Specification 1,569,710 whose anil has a melting point of 280° C.

(C) Use of the compound (I) as a pigment:

EXAMPLE 7

The pigment prepared according to Examples 1 to 4 may be used for example for the following formulations:

(a) Varnish printing ink for book and offset printing:

20 parts of pigment
80 parts of book or offset varnish
_____
100 parts

The dispersion is carried out for example on a three roll mill.

(b) Photogravure ink 5 parts of pigment
30 parts of resin (for example colophony resin modified with phenol formaldehyde)
65 parts of toluene
_____
100 parts The dispersion is carried out for example in an attrition mill.

(c) Nitrocellulose lacquer (α) Full tone 2.5 parts of pigment
97.5 parts of nitrocellulose lacquer (see below)
_____
100 parts of full tone lacquer (β) Brightening 10 parts of full tone lacquer
90 parts of white lacquer (from 10° of titanium dioxide and 90% of nitrocellulose lacquer)
_____
100 parts.

The nitrocellulose lacquer may have the following composition, for example:

19.0% of nitrocellulose (moist with resin)
4.0% of synthetic resin (ketone resin)
8.7% of plasticizer
30.0% of butyl acetate
10.0% of ethyl acetate and
29.3% of toluene
_____
100.0% (about)

Transparent (d) Coloring soft polyvinyl chloride 0.05 part (=0.1%) of pigment and
50.00 parts (about 100%) of unplasticized PVC mixture
Covering: (1:10):
0.25 part (=0.5%) of pigment
2.5 parts (=5%) of titanium dioxide and
50.0 parts (about 100%) of unplasticized PVC mixture.

The PVC mixture may have the following composition:

65 parts of PVC powder
35 parts of plasticizer and
2 parts of stabilizer.

Coloring of the PVC takes place on a heatable mixing roll mill.

(e) Disperse dye for the paint industry 1.0 part of an aqueous pigment preparation which contains 0.5 part of the pigment and a nonionic wetting agent;
52.5 parts of white pigment (for example titanium dioxide or chalk;
12.5 parts of wetting liquid (96% of water, 2% of aqueous 25% ammonia, 1% of polyacrylate and 1% of sodium polyphosphate);
35.0 parts of polymer dispersion (for example of 50% aqueous dispersion of a copolymer based on vinyl propionate)

101 parts of binder color.

Dispersion is carried out in an impeller.

I claim:
1. The compound of the formula:

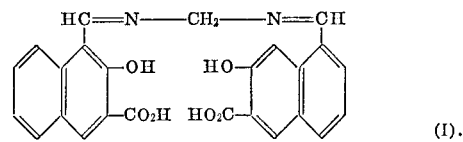

References Cited

UNITED STATES PATENTS 3,457,301    7/1969    Lenoir et al. _____ 260—519
3,513,153    5/1970    Horstmann et al. _____ 260—519

LORRAINE A. WEINBERGER, Primary Examiner

L. A. THAXTON, Assistant Examiner

U.S. Cl. X.R.

106—22, 204; 260—520, 41 C